United States Patent
Friesen et al.

(10) Patent No.: US 10,572,814 B2
(45) Date of Patent: Feb. 25, 2020

(54) SYSTEM AND METHOD FOR QUANTUM COMPUTATION USING SYMMETRICAL CHARGE QUBITS

(71) Applicant: Wisconsin Alumni Research Foundation, Madison, WI (US)

(72) Inventors: Mark Friesen, Middleton, WI (US); Mark Eriksson, Madison, WI (US); Susan Coppersmith, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 211 days.

(21) Appl. No.: 14/996,918

(22) Filed: Jan. 15, 2016

(65) Prior Publication Data
US 2017/0206461 A1    Jul. 20, 2017

(51) Int. Cl.
*G06N 10/00* (2019.01)
*G06F 15/82* (2006.01)

(52) U.S. Cl.
CPC ............. *G06N 10/00* (2019.01); *G06F 15/82* (2013.01)

(58) Field of Classification Search
CPC .............................. G06N 99/002; G06F 15/82
See application file for complete search history.

(56) References Cited

U.S. PATENT DOCUMENTS

2006/0151775 A1* 7/2006 Hollenberg ............ B82Y 10/00
                                                                    257/14

OTHER PUBLICATIONS

Mehl, Sebastian, "Two-qubit pulse gate for the three-electron double quantum dot qubit", Physical Review B, 91, 035430 (2015).*
Doherty et al (Apr. 12, 2013). Two-Qubit Gates for Resonant Exchange Qubits. Retrieved from https://arxiv.org/abs/1304.3416v2.*
Medford et al. "Quantum-Dot-Based Resonant Exchange Qubit." Physical Review Letters vol. 111 (Jul. 31, 2013): 050501-1 to 050501-4.*
Mehl, S. et al., Two-qubit pulse gate for the three-electron double quantum dot qubit, Physical Review, 2015, 91, American Physical Society, United States.
Divincenzo, et al., The Physical Implementation of Quantum Computation, Fortschr. Phys., 2000, 771-783, vol. 48.
Divincenzo, et al., Universal quantum computation with the exchange interaction, Nature, 2000, 339-342, vol. 408, International Journal of Science, United States.
Eng, et al., Isotopically enhanced triple-quantum-dot qubit, Science Advances, 2015, vol. 1, AAAS, United States.

(Continued)

*Primary Examiner* — Feifei Yeung Lopez
(74) *Attorney, Agent, or Firm* — Quarles & Brady LLP

(57) ABSTRACT

A quantum computing system and method for performing quantum computation is provided. In some aspects, the system includes at least one charge qubit comprising a quantum dot assembly prepared with a symmetric charge distribution, wherein the symmetric charge distribution is configured to reduce a coupling between the charge qubit and a charge noise source. The system also includes a controller for controlling the at least one charge qubit to perform a quantum computation. The system further includes an output for providing a report generated using information obtained from the quantum computation performed.

19 Claims, 8 Drawing Sheets

(56) References Cited

OTHER PUBLICATIONS

Gaudreau, et al., Coherent control of three-spin states in a triple quantum dot, Nature Physics, 2011, 654-659, vol. 8, Int. Journal of Science, United States.
Medford, et al., Self-consistent measurement and state tomography of an exchange-only spin qubit., Nature Nanotechnology, 2013, 654-659, vol. 8, Int. Journal of Science, United States.
Medford et al., Quantum-Dot-Based Resonant Exchange Qubit, Phys. Rev. Lett., Jul. 31, 2013, vol. 111, American Physical Society, United States, pp. 1-12.
Taylor, et al., Electrically Protected Resonant Exchange Qubits in Triple Quantum Dots, Phys. Rev. Lett., Mar. 5, 2004, vol. 111, American Physical Society, United States, pp. 1-5.
Zhou, et al., Dispersive manipulation of paired superconducting qubits, Phys. Rev., Mar. 5, 2004, vol. 1, United States, pp. 1-5.
You, et al., Correlation-induced suppression of decoherence in capacitively coupled Cooper-pair boxes, Phys. Rev., Oct. 28, 2005, vol. 72, United States, pp. 1-5.
Shaw, et al., Experimental Realization of a Differential Charge Qubit, IEEE Trans. Appl. Supercond., Jul. 23, 2007, 109-123, vol. 17, 1IEEE, United States.

\* cited by examiner

SYSTEM AND METHOD FOR QUANTUM COMPUTATION USING SYMMETRICAL CHARGE QUBITS

STATEMENT REGARDING FEDERALLY SPONSORED RESEARCH

This invention was made with government support under PHY1104660 awarded by the National Science Foundation, W911NF-12-1-0607 awarded by the US Army/ARO, and N00014-15-1-0029 awarded by the US Navy/ONR. The government has certain rights in the invention.

BACKGROUND OF THE INVENTION

The present disclosure is directed to quantum computation. More particularly, the present disclosure relates to systems and methods for storing and processing quantum information.

In the field of quantum computation, the performance of quantum bits ("qubits") has advanced rapidly in recent years, with a variety of qubit implementations proving to be promising candidates for scalable computing architectures. In contrast with classical computational methods, where data is manipulated and stored in the form of well-defined binary states, or bits, quantum computation takes advantage of the quantum mechanical, probabilistic nature of quantum information. Quantum systems characterized by quantized energy levels can represent a superposition of multiple quantum states.

In general, a qubit can encode quantum information using a simple two-level system whose state can be represented as a vector in a two-dimensional complex Hilbert space. In some approaches, such two-level systems may be constructed using a semiconductor-based quantum dot system, as well as other physical systems. Such implementations are advantageous due to their scalability and ease of integration with present semiconductor-based electronics technologies. In general, quantum dots are artificially structured systems that can be filled with electrons or holes which may become trapped in three dimensions using controllable potential barriers generated by various device configurations and/or electrical gating. The confined electrons or holes can then form localized bound states with discrete energy levels, similar to the quantum states of atoms and molecules. The wavefunctions describing these states may then be utilized to establish the two-level system. Specifically, if the spatial part of an electron wavefunction is used, a charge qubit is achieved, with the spatial wavefunction defining the electron charge distribution. On the other hand, if the spin portion of the wavefunction is used, a spin qubit is produced.

A charge qubit can be implemented using a double-dot configuration having a single excess electron at the highest occupation level localized on one of the dots. However, charge qubits have high decoherence, resulting in the loss of information stored in the qubit. Specifically, the motion of charged defects in the device gives rise to time-varying electric fields causing fluctuations in the detuning, which is the energy difference between the two charge states of the qubit. Such fluctuations reduce the coherence time of the charge qubit, limiting computational applications. In some aspects, the charge qubit coherence may be improved by operating at a "sweet spot," defined as a special value of the detuning where the derivative of the energy difference between the qubit states as a function of detuning is zero. However, so far it has not been possible to achieve high fidelity operations in a charge qubit by exploiting a single sweet spot. In particular, universal qubit control requires the ability to perform rotations about a second axis, and for dc pulsed gates, this second rotation axis needs to be implemented away from the sweet spot, yielding low gate fidelities. In principle, ac gating can be used to perform a universal set of qubit rotations without leaving the sweet spot. However, in practice it is difficult to perform operations with fidelities high enough for quantum information processing applications since noise moves the qubit away from the sweet spot.

Spin qubits can be sufficiently decoupled from their environments, thus providing relatively long quantum information lifetimes for performing computation. However, manipulation of electron spins in quantum dots requires precise control over the magnetic properties of the device and the ability to generate fast-pulse localized magnetic fields. Also, spin qubits are more difficult to couple to external circuitry, and often necessitate use of various spin-charge conversion techniques. By contrast, charge qubits can easily be coupled to external circuitry, facilitating control and measurement. In addition, charge qubits can be easily integrated with present semiconductor technologies, and lend themselves well to scalability due to ease of spatial selectivity addressing individual qubits in a multi-qubit quantum computer architecture. In addition, charge qubits can be manipulated quickly up to gigahertz frequencies. However, charge qubits are susceptible to environmental noise that is intrinsic to the materials and geometries used, and suffer from relatively poor gate fidelities for the same reasons. As such, spin qubits are often considered to be leading candidates in the realization of semiconductor quantum dot-based quantum computers.

In light of the above, there is a need for systems and methods for quantum computing based on charge qubit implementations that are amenable to realistic computing architectures.

SUMMARY OF THE INVENTION

The present disclosure overcomes the drawbacks of previous technologies by providing a quantum system and method for quantum computation. Specifically, in recognizing that electric field fluctuations are a strong source of decoherence in conventional charge qubits, which lead to reduced quantum information lifetimes, a novel charge qubit is therefore provided. As will be described, charge qubits implemented in quantum dot assemblies prepared with symmetric charge distributions substantially reduce dominant dipolar contributions to the dephasing caused by charge noise, thereby appreciably enhancing qubit coherence times in comparison to conventional charge qubits.

In accordance with one aspect of the disclosure, a quantum computing system for performing quantum computation is provided. The system includes at least one charge qubit comprising a quantum dot assembly prepared with a symmetric charge distribution, wherein the symmetric charge distribution is configured to reduce a coupling between the charge qubit and a charge noise source. The system also includes a controller for controlling the at least one charge qubit to perform a quantum computation. The system further includes an output for providing a report generated using information obtained from the quantum computation performed.

In accordance with one aspect of the disclosure, a method for performing quantum computation is provided. The method includes preparing at least one charge qubit comprising a quantum dot assembly with a symmetric charge distribution that is configured to reduce a coupling between the charge qubit and a charge noise source, and controlling the at least one charge qubit to perform a quantum computation. The method also includes performing a readout of the at least one charge qubit following the quantum computation. The method further includes generating a report using information obtained from the quantum computation performed.

The foregoing and other aspects and advantages of the invention will appear from the following description. In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Figure 1:
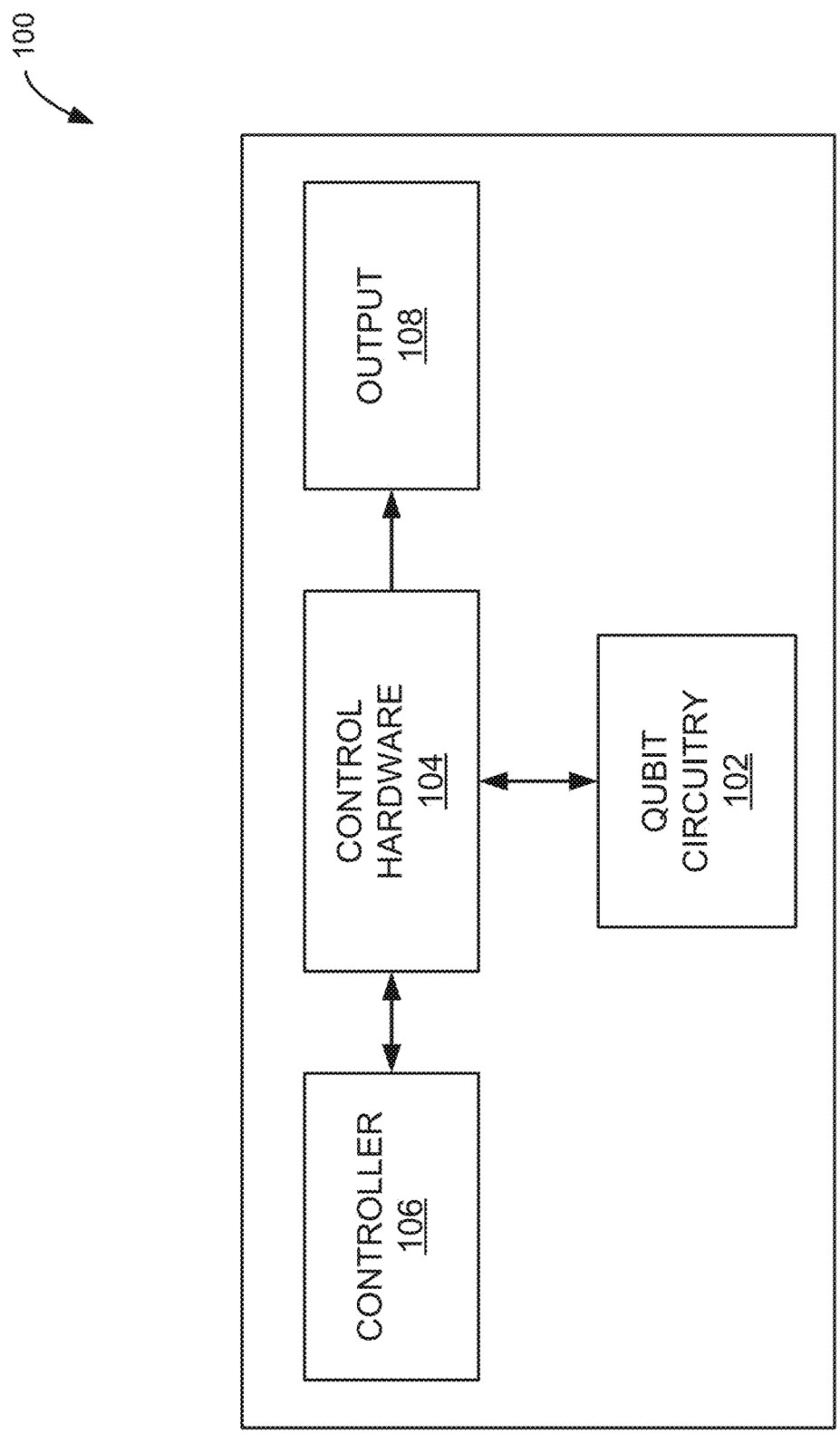
FIG. 1 is a schematic of an example system for use in quantum computation in accordance with the present disclosure.

It is a well-known problem that conventional semiconductor charge qubits suffer from the loss of quantum information due to coupling to external noise sources. In particular, charge noise due to trapped defects and metallic gates can lead to strong decoherence. Motion of charges that are much farther from the qubit than the qubit size generate electric fields that vary slowly in space. A charge qubit sensitive to these ubiquitous fields would then experience undesirable decoherence. However, the realization of any viable quantum computing architecture, according to the DiVincenzo criteria, would not only necessitate low decoherence for carrying out sufficient qubit operations and measurements, but also the capability for communication. That is, a charge qubit would require strong response to fields that vary quickly in space at short length scales in order to achieve fast operations and strong coupling to other qubits or external circuitry. Hence, it is a discovery of the present disclosure that highly symmetric quantum dot qubit structures can achieve both sensitivity to strongly varying electric fields, enabling fast gate operations and quantum information exchange, as well as an insensitivity to remote charge noise, leading to long coherence times.

Therefore, the present disclosure provides a system and method for quantum computation that is based on symmetric quantum dot-based qubit configurations, and more particularly on charge qubits prepared with symmetric charge distributions. As will be appreciated from descriptions below, the present approach is advantageous for reducing dominant dipolar contributions to the charge noise that are responsible for the loss of quantum information in charge qubits. In this manner, significantly increased coherence times can be achieved in comparison to conventional charge qubits.

In one embodiment, a charge quadrupole qubit based on three quantum dots arranged collinearly and prepared with one electron in a symmetrical charge distribution is disclosed. In particular, such a qubit may be defined using basis states having different charge distributions with the same center of mass. That is, a localized state can be included in the center dot, and a delocalized state with a symmetric superposition of charge can be included in the left and right dots. Since these states do not form a dipole, uniform electric field fluctuations due to charge noise would not change the energy difference between the states, and hence would not lead to appreciable decoherence. Although a third "leakage" state, corresponding to an anti-symmetric superposition of charge in the left and right dots, could lead to an unwanted dipole in a triple dot assembly, enforcing a symmetric geometry would decouple such a state, resulting in suppressing the dipole.

Although some qubit realizations have been attempted using three quantum dots, these are fundamentally different because they rely on the spin degree of freedom, rather than charge, and utilize spin-based configurations and operational techniques. Also, any implementation in a realistic quantum computer would necessitate spin-charge conversion capabilities in order to communicate with external circuitry, such as other qubits, a bus, a stripline, or other measurement circuitry. In addition, although spin-based qubits could be less sensitive to charge noise in some designs, gating protocols necessary for qubit operation would nonetheless lead to non-symmetric charge configurations, and hence enhanced decoherence during such operations. By contrast, charge qubit embodiments described herein are explicitly designed to be highly symmetric even during gating operations.

As may be appreciated, concepts detailed in the present disclosure need not be limited to triple dot charge qubits, and may be readily extended to other symmetrical qubit configurations. For instance, a four dot charge qubit may be possible, in which three quantum dots are arranged at 120 degree angles relative to a central dot, or a five dot charge qubit, in which four quantum dots are arranged symmetrically relative to the central dot. Furthermore, although described in the context of charge qubits involving a single electron, the present approach may be readily extended to include logical spin qubits that include more than one electron, as well.

Turning now to FIG. 1, an example quantum computing system 100 for quantum computation or quantum information processing in accordance with the present disclosure, is shown. As shown, the system 100 can include qubit circuitry 102, control hardware 104 in communication with the qubit circuitry 102, and a controller 106 for directing the control hardware 104 to carry out various qubit manipulations and measurements, along with other operations. The system 100 also includes an output 108 for providing the quantum computation results. In general, the system 100 may be configured to operate over a broad range of conditions, and as such may include capabilities and hardware for achieving those conditions. For instance, although not shown in FIG. 1, the system 100 may be configured to achieve and sustain ultra-low temperatures, such as temperatures below a few Kelvin, for example.

In some embodiments, the qubit circuitry 102 includes one or more charge qubits implemented using a quantum dot assembly. In accordance with aspects of the present disclosure, the quantum dot assembly may be configured symmetrically to substantially reduce or eliminate a coupling between the charge qubit(s) and a charge noise source, such as a noise originating from trapped defects or metallic leads. In one example, the quantum dot assembly may include three dots arranged collinearly. In another example, the quantum dot assembly may include four dots, in which three dots are arranged symmetrically at 120 degree angles relative to a central dot. In yet another example, the quantum dot assembly may include five dots, in which four dots are arranged symmetrically at 90 degree angles relative to a central dot. Other symmetrical charge qubit configurations are also possible. For instance, a quadrupole geometry may be achieved using a combination of a quantum dot and donor confinement potentials, as will be described. Furthermore, in some aspects, the qubit circuitry 102 may additionally or alternatively include logical spin qubits, as well as any number of linear and non-linear circuit components, including inductors, capacitors, resistors, diodes, and so on.

As known in the art, a quantum dot is a general term referring to a physical system where one or more electrons (or holes) may be confined. By tuning the confinement strength and electrochemical potential using lateral or vertical gates, as well as the coupling to other dots or reservoirs, the size and occupation of the each dot can be controlled to obtain a wide variety of quantum systems for use in quantum computation. For instance, quantum dots have been obtained using trapped molecules, layered or patterned metallic, semiconducting and superconducting materials, ferromagnetic nanoparticles, self-assembled crystals or colloids, nanowires, carbon nanotubes, graphene, and so on. In this regard, the quantum dot assembly may be constructed using any such lateral and/or vertical circuit configurations, as well as using various materials and geometries. For instance, the quantum dot assembly can include a number of semiconductor quantum dots produced using nanofabricated GaAs/AlGaAs or Si/SiGe heterostructures, or metal-oxide-semiconductor interfaces.

Figure 2:
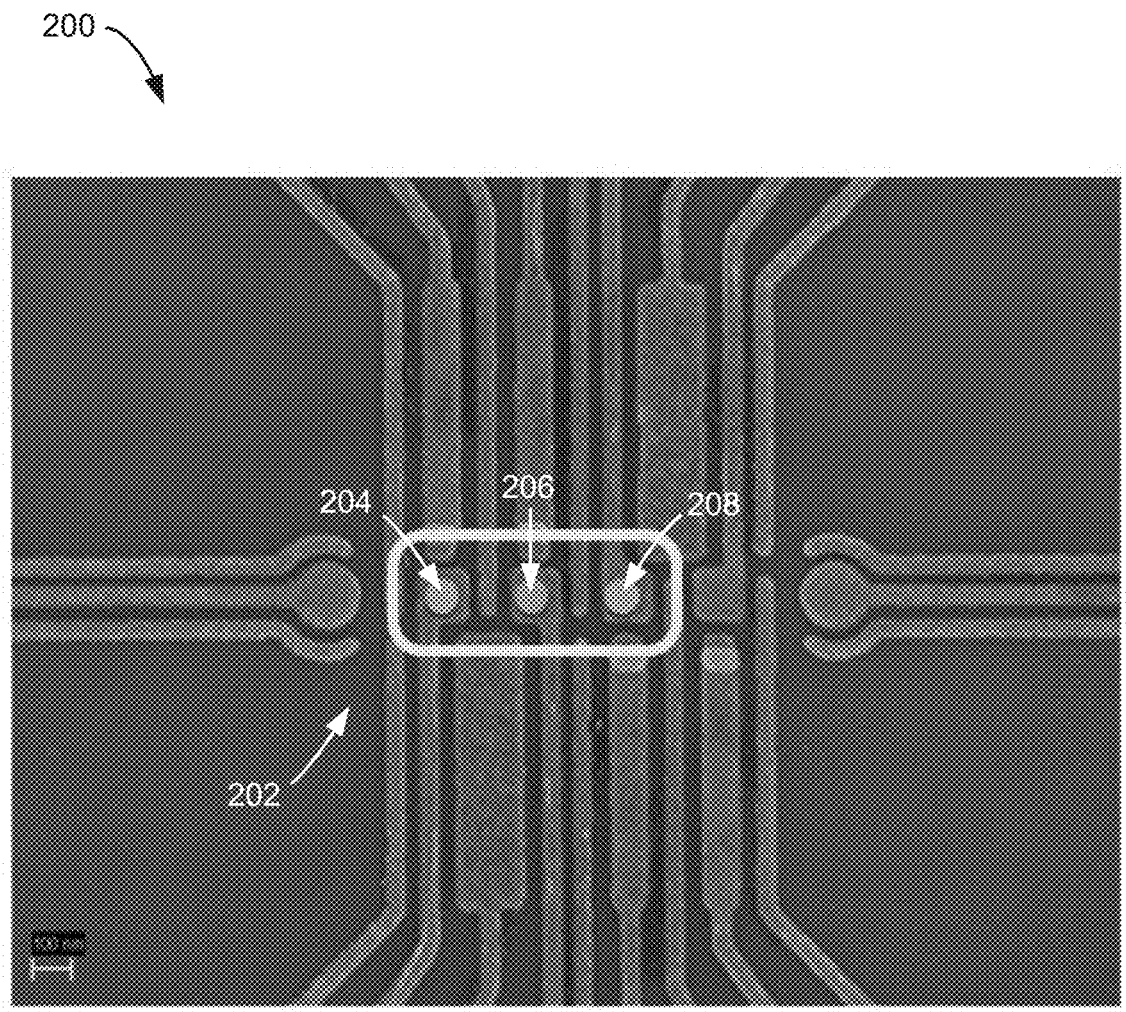
FIG. 2 shows a non-limiting example of a charge qubit with a symmetric three-dot configuration, in accordance with aspects of the present disclosure.

In some aspects, the qubit circuitry 102 may include various circuit elements for use in the preparation, manipulation, and readout of the charge qubit(s). For instance, the qubit circuitry 102 may include one or more metallic gating leads configured to control charge confinement and states of the quantum dots in the quantum dot assembly. By way of example, FIG. 2 shows one non-limiting lateral device implementation of a qubit 200 having a symmetric configuration. The qubit 200 includes a quantum dot assembly 202 consisting of three quantum dots. Specifically, the assembly 202 includes a first dot 204, a second dot 206, and a third dot 208, arranged collinearly on the left, center, and right part of the assembly 202, respectively. As shown, the qubit 200 can include a number of metallic gating leads for controlling the manipulation and measurement of the qubit 200. In some aspects, a localized state can be prepared in the second dot 206, and a delocalized state with a symmetric superposition of charge can be prepared in the first dot 204 and third dot 208, as described. That is, changing the quadrupole detuning changes the energy of the second dot 206 relative to the first dot 204 and the third dot 208.

Referring again to FIG. 1, in addition to gating leads, the qubit circuitry 102 may also include one or more charge sensors coupled to the quantum dot assembly configured for measuring qubit states. Example charge sensors can include tunnel probes, quantum point contacts, single electron transistors, as well as other sensors logically connected to the qubit circuitry 102 for sensing charge therein. In addition, the qubit circuitry 102 may also include one or more sources or drains for measuring charge transport through the qubit circuitry 102. Furthermore, the qubit circuitry 102 may also include elements for coupling of the quantum dot assembly to external components.

Figure 3A:
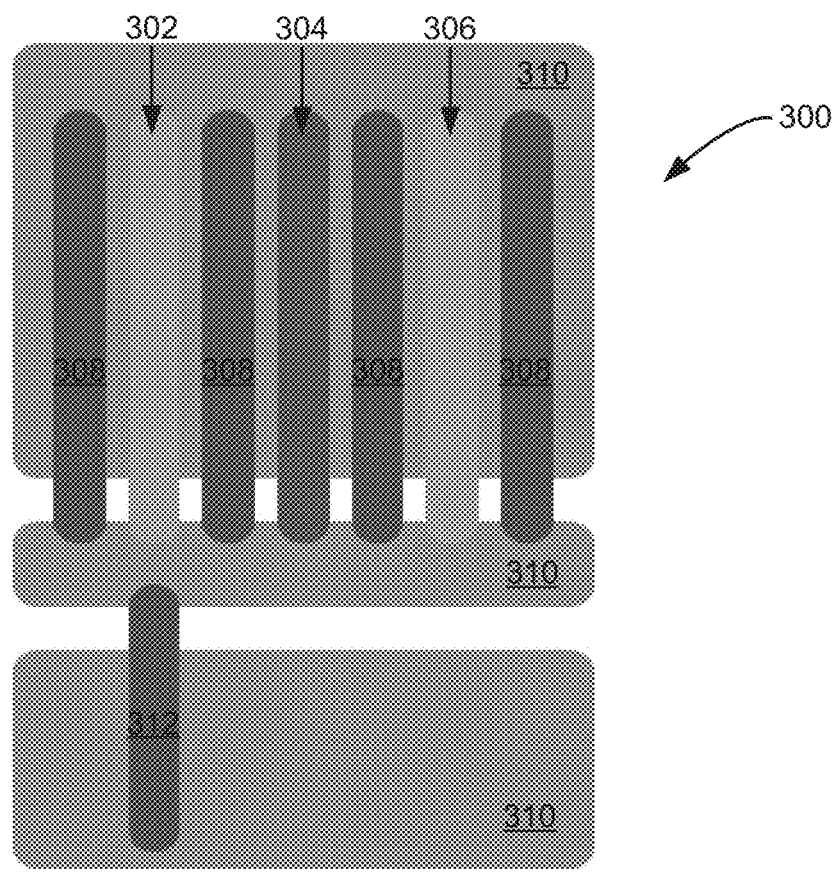
FIG. 3A shows another non-limiting example of a charge qubit with a symmetric three-dot configuration, in accordance with aspects of the present disclosure
Figure 3B:
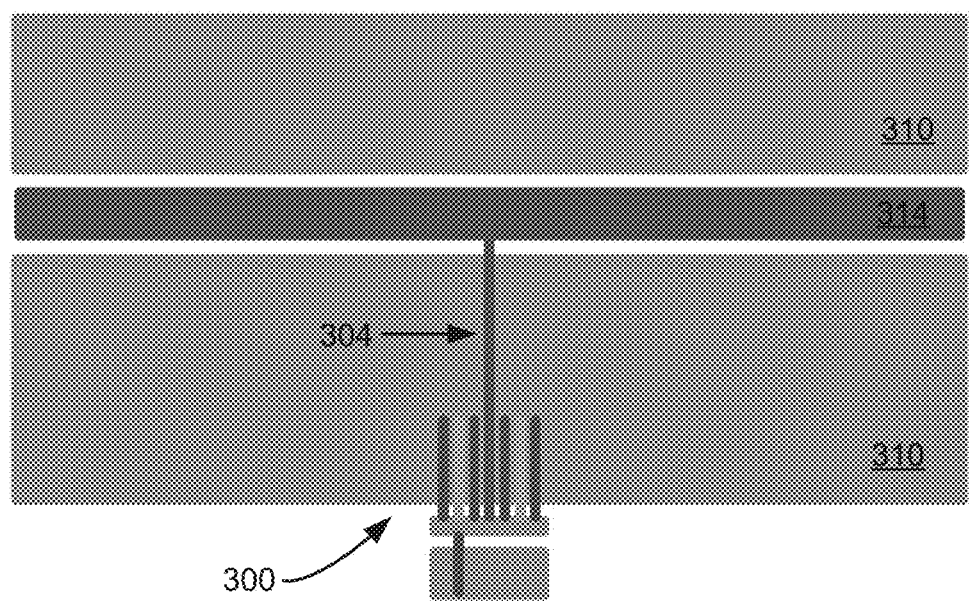
FIG. 3B shows yet another non-limiting example of a charge qubit with a symmetric three-dot configuration, in accordance with aspects of the present disclosure

By way of example, FIGS. 3A and 3B shows another non-limiting implementation of a qubit 300 having a symmetric three-dot lateral configuration. Referring specifically to FIG. 3A, the first gate 302, the second gate 304, and third gate 306 each define a quantum dot in the triple dot assembly. The qubit 300 also includes a number of barrier gates 308, as well as shielding regions 310, configured such that carriers would not be induced in the shielding regions 310. For example, the shielding regions 310 may include metallic films. In addition, the qubit 300 may also include a direct barrier gate 312 that allows for charge sensing on the qubit 300. In particular, charge sensing is performed through the constriction defined by the direct barrier gate 312. As shown in FIG. 3B, in some implementations, the second gate 304 may be connected to a co-planar waveguide 314, including a waveguide superconducting resonator. It may be appreciated that the second gate 304, as well as the other gates, may also be connected with other qubits, a bus, a stripline, and other circuitry. In some aspects, the first gate 302 and third gate 306 in FIGS. 3A and 3B may be controlled symmetrically with respect to the second gate 304 in order to achieve a symmetric charge distribution.

Referring again to FIG. 1, the control hardware 104 can include any number of electronic systems, hardware or circuitry components, capable of a wide range of functionality for controlling the qubit circuitry 102. For instance, the control hardware 104 can include one or more voltage sources, current sources, microwave sources, spectrometers, signal generators, amplifiers, and so forth. Such control hardware 104 may be configured to send, receive and process a wide array of signals. For example, the control hardware 104 may be configured to generate a number of pulsed voltages, or currents, to achieved pulsed gates for implementing qubit operations.

In general, the control hardware 104, as directed by the controller 106, may be used to prepare the qubit(s) formed by the qubit circuitry 102, as described. For instance, the control hardware 104 may be configured to populate the quantum dot assembly with one or more electrons (or holes). In addition, the control hardware 104 may be configured to form qubit states for the charge qubit using different charge distributions having the same center of mass. In some aspects, the control hardware 104 may prepare and manipulate the qubit(s) with symmetric charge distribution, such that a coupling between the qubit(s) and a charge noise source is substantially reduced or eliminated. For example, the control hardware 104 may perform a number of quantum logic operations, including the application of ac gates, dc gates, pulsed gates, and combinations thereof, while preserving charge symmetry. The control hardware 104 can then readout the qubits(s), for instance, using one or more charge sensors, and provide, via the output 108, a report of any form for the quantum computation results obtained.

Figure 4:
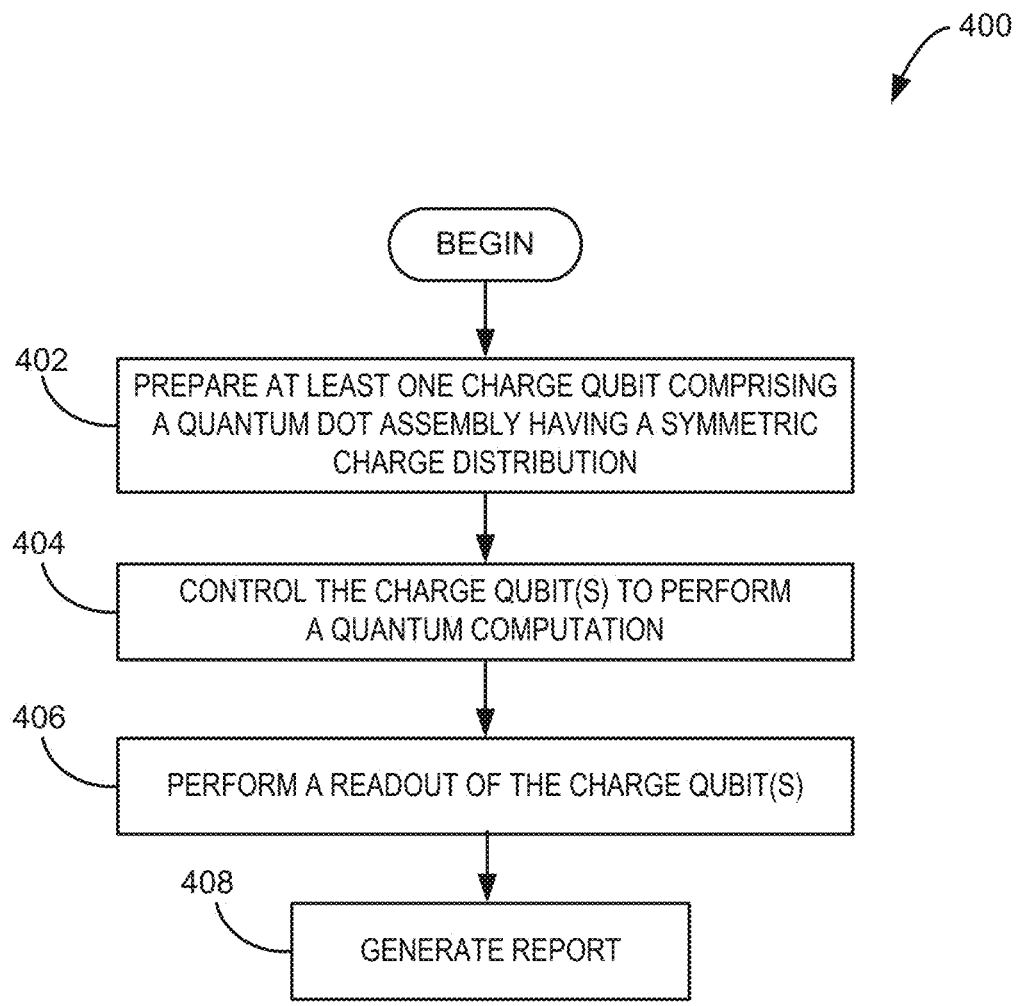
FIG. 4 is a flowchart setting forth steps of a process, in accordance with aspects of the present disclosure.

Turning now to FIG. 4, a flowchart setting forth steps of a process 400 for quantum computation, in accordance with aspects of the present disclosure, is shown. In some implementations, the process 400 may be carried out using a system as described with reference to FIG. 1. The process 400 may begin at process block 402 with tuning or preparing various qubit states of one or more qubits. Specifically, at least one charge qubit, constructed using a quantum dot assembly having symmetric charge distribution, may be prepared at process block 402. As will be described, such charge qubits may be defined using basis states having different charge distributions and the same center of mass. For example, in a three dot quantum dot assembly, a localized state can be included in a center dot, and a delocalized state with a symmetric superposition of charge can be include in the left and right dots.

At process block 404, a number of steps may be carried out on the qubit(s) to manipulate the qubits and perform various quantum computations. For example, a number of quantum logic operations may be carried out, including the application of ac gates, dc gates, pulsed gates, and combinations thereof. Then, readout of the qubits(s) may be carried out, for instance using one or more charge sensors, as indicated by process block 406. A report may then be generated and provided to an output at process block 408, the report being in any form and indicating the results of quantum computations performed. For example, the report may provide information regarding a state of the charge qubit following the application of one or more quantum operations.

In a conventional double-dot charge qubit, charge may be localized in two different configurations, namely left-localized and right localized, defined as $|10\rangle_c$ and $|01\rangle_c$, respectively, where the subscript c indicates a charge basis state. As described above, such a conventional qubit, herein referred to as a charge dipole ("CD") qubit, couples to spatially uniform electric fields. By contrast, a charge quadrupole ("CQ") qubit implemented in a triple quantum dot, and prepared in accordance with aspects of the present disclosure, provides new possibilities for qubits that are not dipolar, as detailed below.

In a qubit, it may be useful to express electrical noise in terms of fluctuations of the detuning parameters in the Hamiltonian. Long-wavelength noise that that couples to a charge dipole can be associated with the dipolar detuning parameter $\epsilon_d$, while noisy field gradients parallel to the qubit axis, can be associated with the quadrupolar detuning parameter $\epsilon_q$. Below, it is shown that the energy difference between CQ qubit states is independent of $\epsilon_d$ fluctuations, yielding an $\epsilon_d$ sweet spot. It is also shown that in typical semiconductor quantum dots, fluctuations of $\epsilon_d$ are much stronger than those of $\epsilon_q$, when the noise originates from remote charge fluctuators. Universal sets of pulsed and resonant gate operations for CQ qubits are also described, where in some aspects, $\epsilon_q$ is used as a control parameter, while keeping $\epsilon_d$ fixed at its sweet spot. Moreover, it is shown the effects of fluctuations in $\epsilon_d$ (which mainly give rise to leakage as opposed to dephasing) can be made very small by appropriate choice of qubit parameters. As a result, a CQ qubit as described below, would be mainly sensitive to fluctuations of the quadrupolar detuning $\epsilon_q$, herein denoted as $\delta \epsilon_q$, yielding significant improvements in gate fidelities.

Figure 5:
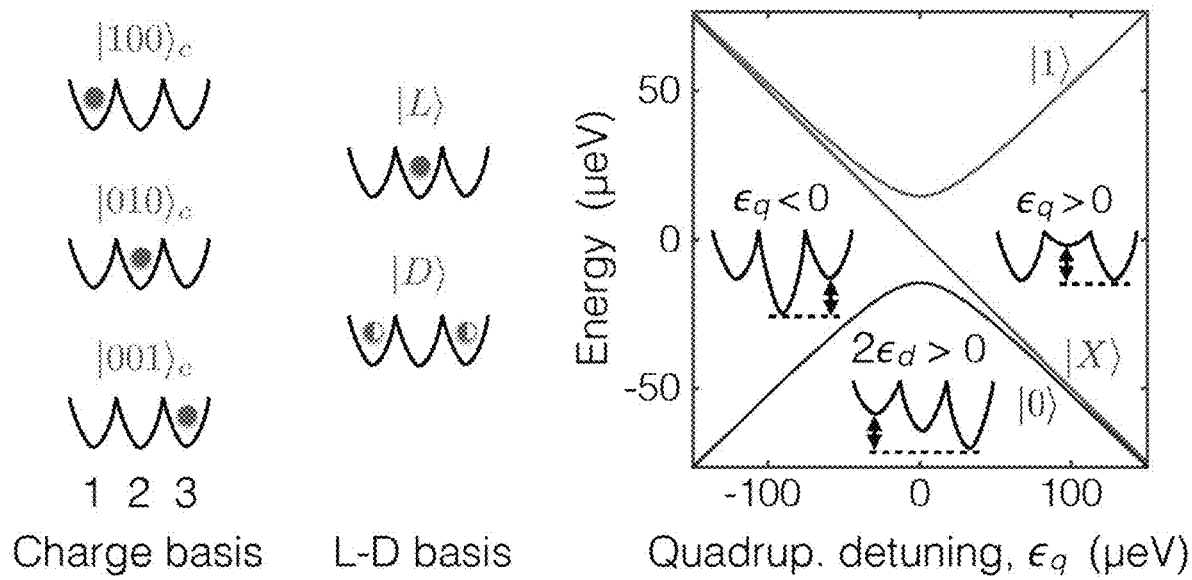
FIG. 5 is an illustration showing the charge states of an example charge quadrupole qubit formed using a single electron in a symmetric triple quantum dot, in accordance with aspects of the present disclosure.

As described, in some embodiments, a CQ qubit may be implemented using a symmetric triple dot configuration. As shown in FIG. 5, such a CQ qubit may be described using charge bases $|100\rangle_c$, $|01\rangle_c$ and $|001\rangle_c$, with a Hamiltonian given by:

$$H = \begin{pmatrix} U_1 & t_A & 0 \\ t_A & U_2 & t_B \\ 0 & t_B & U_3 \end{pmatrix} \quad (1)$$

The parameters $t_A$ and $t_B$ are the $|100\rangle_c$-$|010\rangle_c$ and $\langle 010|_c$-$|001\rangle_c$ tunneling amplitudes, and $U_1$, $U_2$ and $U_3$ are site potentials. It is convenient to define the polar and quadrupolar detuning parameters as $$\epsilon_d = \frac{U_1 - U_3}{2} \text{ and } \epsilon_q = U_2 - \frac{U_1 + U_3}{2} \quad (2)$$

Note that the dipolar detuning $\epsilon_d$ corresponds to what is commonly termed $\epsilon$ in a conventional, double dot charge qubit. Up to a diagonal constant term, the Hamiltonian is then given by $$H = \begin{pmatrix} \epsilon_d & t_A & 0 \\ t_A & \epsilon_q & t_B \\ 0 & t_B & -\epsilon_d \end{pmatrix} \quad (3)$$

The qubit states $|0\rangle$ and $|1\rangle$ would then be the lowest and highest energy eigenstates of the 3-level Hamiltonian, Eqn. (3). As described, the other eigenstate is a leakage state, $|X\rangle$, which would not be occupied during successful operation. Explicit solutions for the qubit energy splitting $E_{01} = E_1 - E_0$ are obtained below, whose fluctuations determine the qubit dephasing.

As mentioned, a CQ qubit, in accordance with the present disclosure, is by design less susceptible to charge noise than a CD qubit because in solid state devices the dipolar component of the charge noise, $\epsilon_d$, is typically much larger than the quadrupolar component, $\epsilon_q$. Herein, the relative strengths of these two components are estimated based on experimental measurements of charge noise in semiconducting qubit devices. The basis for this argument is that both types of electric field noise arise from the same remote charge fluctuators.

When considering charge noise from remote charge traps in the semiconductor device, a simple model may include a charge trap with two possible states: occupied or empty. Compared to a dipole fluctuator, in which the charge toggles between two configurations separated by less than a nanometer, the monopole fluctuator can be considered as a worst-case scenario in terms of its effect on the quadrupolar detuning. This is because the monopole field decays as $1/R$ while the dipole field decays as $1/R^2$, where R is the dot-fluctuator separation. This monopole model can be used to estimate the characteristic separation R between the fluctuator and the quantum dot, based on charge noise measurements in a double-dot charge qubit. In particular, experimental measurements of the dephasing of charge qubits yield estimates for the standard deviation of the dipole detuning parameter, ac, ranging approximately between 3 and 8 μeV for double dots separated by roughly 200 nm, leading to estimates for the dot-fluctuator separation of R approximately between 1.1 and 2.5 μm.

With this information, the ratio $\delta\epsilon_q/\delta\epsilon_d$ can be estimated. In a worst-case scenario, corresponding to the strongest quadrupolar fluctuations, the monopole fluctuator would be lined up along the same axis as the triple dot. Adopting a point-charge approximation for the fluctuation potential, $V(r)=e^2/4\pi r$, and assuming $L/R \ll 1$, Eqn. (2) then yields $$\frac{\delta\epsilon_q}{\delta\epsilon_d} \simeq \frac{L}{R}. \quad (4)$$

As an example, typical devices have dimensions L approximately 200 nm, and R approximately between 1 and 3 μm. This leads to an estimate for the ratio $\delta\epsilon_q/\delta\epsilon_d$ approximately between 0.07 and 0.2. In other words, in this case, quadrupolar detuning fluctuations would be approximately 10 times weaker than dipolar detuning fluctuations. In fact, it may be appreciated from Eqn. (4) that as device dimensions are reduced, $\delta\epsilon_q/\delta\epsilon_d$ can be further suppressed. For example, quantum devices with dot separations L of approximately 50 nm, would yield further reduction in $\delta\epsilon_q/\delta\epsilon_d$ by a factor of 4.

The four independent (and, in general time-varying) parameters in the Hamiltonian, Eqn. (3), are tuned to yield desirable properties during qubit operations. To specify the procedure, a discussion of the qubit states and how they depend on the Hamiltonian parameters is now given. Specifically, the eigenvalues E of Eqn. (3) satisfy the equation:

$$(E^2-\epsilon_d^2)(E-\epsilon_q)-t_A^2(E+\epsilon d)-t_B^2(E-\epsilon_d)=0 \quad (5)$$

The energy eigenstates $|0\rangle$ and $|1\rangle$ are the lowest and highest energy eigenstates of the Hamiltonian, while the other eigenstate $|X\rangle$ is a leakage state.

Goals of the tuning procedure would be to suppress the leakage into the state $|X\rangle$ during gate operations, suppress the dephasing caused by $\delta\epsilon_d$ fluctuations, and suppress the dephasing caused by $\delta\epsilon_q$ fluctuations. In particular, it may be appreciated that insignificant dephasing due quadrupolar fluctuations may be readily achievable because $\delta\epsilon_q$ fluctuations are already weak, according to Eqn. (4).

It is advantageous to suppress the leakage to state $|X\rangle$, which may occur when a control parameter (e.g., $\epsilon_d$ or $\epsilon_q$) is varied, generating a nonzero projection of the electron wavefunction onto the leakage state. Leakage occurs because in general the composition of the leakage state depends on the control parameter. However, leakage can be suppressed by minimizing this dependence, through a judicious tuning of the CQ qubit. In order to appreciate this, let the leakage state be expressed as $|X\rangle=(a,b,c)$ in the charge basis and impose the constraint:

$$\frac{|X\rangle}{\delta\epsilon_d} = \frac{\partial|X\rangle}{\delta\epsilon_q} = 0 \quad (6)$$

Combining the above conditions with the eigenstate equation $H|X\rangle=E_x|X\rangle$ yields the auxiliary equations $(\partial H/\partial\epsilon_d)|X\rangle=(\partial E_X/\partial\epsilon_d)|X\rangle$ and $(\partial H/\partial\epsilon_q)|X\rangle=(\partial E_X/\partial\epsilon_q)|X\rangle$, from which the requirements for leakage suppression can be derived, namely $\epsilon_d=b=at_A+ct_B=E_X=0$.

As described, it is desirable to suppress the dephasing that arises from $\delta\epsilon_d$ fluctuations. Such dephasing occurs since $\delta\epsilon_d$ fluctuations produce fluctuations in the energy eigenvalues in Eqn. (5). As such, expressing $\epsilon_d$ in terms of its average ($\bar{\epsilon}_d$) and fluctuating ($\delta\epsilon_d$) components, where $\bar{\epsilon}_d=0$ would enforce leakage suppression, the leading order (i.e., linear) dependence on $\delta\epsilon_d$ can be eliminated in Eqn. (5) by setting $t_A=t_B=t$. This establishes a sweet spot:

$$t_A=t_B \text{ and } \epsilon_d=0 \quad (7)$$

At this operating point the leakage state is given by $|X\rangle=(1,0,-1)/\sqrt{2}$. In principle, it may be possible to establish a $\epsilon_d$ sweet spot, even for the case of an asymmetric geometry with $t_A \neq t_B$. This is consistent with the notion that it would be possible to find two orthogonal states with the same center of mass in a triple-dot geometry, regardless of the symmetry. However, only the symmetric geometry described above can suppress leakage during gate operations.

The combined requirements of $\bar{\epsilon}_d=0$ and $t_A=t_B=t$ suggest that the optimized CQ qubit geometry would be highly symmetric. To achieve such symmetry in a triple-dot qubit, it may be assumed that $t_A$ and $t_B$ are independently tunable. Since, as described above, dipolar detuning fluctuations can be much more important than quadrupolar detuning fluctuations, suppressing dephasing caused by $\delta\epsilon_d$ fluctuations may take precedence over suppressing dephasing caused by $\delta\epsilon_q$ fluctuations. As such, $\bar{\epsilon}=0$ may be fixed and $\epsilon_q$ can be adopted as a control parameter.

Hence, after setting $t_A=t_B=t$ and $\epsilon_d=0$, Eqn. (3) can be solved analytically, yielding $$E_0 = \frac{\epsilon_q - \sqrt{\epsilon_q^2+8t^2}}{2} \quad |0\rangle = \frac{(t, E_0, t)}{\sqrt{E_0^2+2t^2}}, \quad (8)$$

$$E_X = 0 \quad |X\rangle = \frac{1}{\sqrt{2}}(1, 0, -1) \quad (9)$$

$$E_1 = \frac{\epsilon_q + \sqrt{\epsilon_q^2+8t^2}}{2} \quad |1\rangle = \frac{(t, E_1, t)}{\sqrt{E_1^2+2t^2}}, \quad (10)$$

The resulting energy level diagram is shown as a function of the quadrupolar detuning parameter $\epsilon_q$ in FIG. 5. In the figure, $\epsilon_q/2$ was subtracted from all energies in order to obtain the conventional energy dispersion for a charge qubit. As appreciated from FIG. 5, the leakage level lies between the two qubit levels, which is an uncommon feature for logical qubits. However, it is clear $|X\rangle$ that decouples from $|0\rangle$ al $|1\rangle$ by expressing Eqn. (3) in the basis $\{(0,1,0), 1/\sqrt{2}(1,0,1), 1/\sqrt{2}(1,0,-1)\}$. The resulting Hamiltonian is block diagonal, with $H=H_{2D}\otimes 0$ and $$H_{2D} = \begin{pmatrix} \epsilon_q/2 & \sqrt{2}\,t \\ \sqrt{2}\,t & -\epsilon_q/2 \end{pmatrix} + \frac{\epsilon_q}{2} \quad (11)$$

where the first term on the right-hand side expresses the charge qubit Hamiltonian in standard form, and the constant term $\epsilon_q/2$ may be considered irrelevant. For any control parameter $\alpha$, a sweet spot may be defined as a point where the energy difference between the qubit states $E_{01}$ satisfies $\partial E_{01}/\partial\alpha=0$. CD and CQ qubits both have sweet spots with respect to the $\epsilon_d$ tuning parameter, which arise from the same physical mechanism, namely when the adiabatic qubit eigenstates have the same center of mass, the dipole moment vanishes and the qubit decouples from uniform external fields. For a conventional CD qubit, the fluctuations of $\epsilon_d$ away from its sweet spot merely cause dephasing. However for a CQ qubit, the $\delta\epsilon_d$ fluctuations cause an asymmetric charge distribution, consistent with a partial occupation of the leakage state $|X\rangle$. This leakage will be explored in further detail below.

In some aspects, the ideal case with no leakage may be considered, focusing on the localized/delocalized basis states, $$|L\rangle=(0,1,0),\ |D\rangle=1/\sqrt{2}(1,0,1), \quad (12)$$

as defined in the charge basis. Without loss of generality, we may also refer to the states $|L\rangle$ and $|D\rangle$ in terms of their occupation probabilities $(0,1,0)$ and $(\frac{1}{2},0,\frac{1}{2})$. In the subspace spanned by $\{|L\rangle,|D\rangle\}$, the qubit eigenstates are now given by $$|0\rangle=\frac{(\sqrt{2}\,t,E_1)}{\sqrt{E_1^2+2t^2}}\ \text{and}\ |1\rangle=\frac{(\sqrt{2}\,t,E_0)}{\sqrt{E_0^2+2t^2}} \quad (13)$$

At the CQ sweet spot specified by Eqn. (7), both $\partial\epsilon_0/\partial\epsilon_d=0$ and $\partial E_1/\partial\epsilon_d=0$. At this working point, Eqns. (8) and (10) yield $$E_{01}=\sqrt{\epsilon_q^2+8t^2} \quad (14)$$

Hence, it may be seen that $\epsilon_d=\epsilon_q=0$ corresponds to a double sweet spot, $\partial E_{01}/\partial\epsilon_d=\partial E_{01}/\partial\epsilon_q=0$, where the qubit is also protected from small fluctuations of $\epsilon_q$. It may be recognized that spending as much time as possible at this double sweet spot would be advantageous. However, applying dc gates to obtain a second rotation axis would pulse away from this sweet spot. Nevertheless, this can be readily accomplished by varying $\epsilon_q$, while still remaining at the $\epsilon_d$ sweet spot. By contrast, ac gating can be accomplished while remaining near the double sweet spot at all times, by adding a resonant drive to $\epsilon_q$ at its average value $\bar{\epsilon}_q=0$. The consequences of fluctuations for ac and dc gate operations are discussed below.

Thus far, it has been assumed that electric field fluctuations, $\delta F$, couple to $\epsilon_d$ but not to $\epsilon_q$. This relies on particular assumptions regarding the symmetries of a triple dot. However, in realistic devices, such assumptions might not hold. Specifically, if the triple-dot symmetry is imperfect, uniform field fluctuations can induce effective quadrupolar fluctuations $\delta\epsilon_q$, thus interfering with the CQ noise protection. This dot-to-dot variability is now explored.

As described, quantum dots are generally confined in all three dimensions, and in particular with vertical confinement being typically very strong. As such, a sub-band approximation can be made, in which the vertical dimension is ignored. The dot can then be treated as a two-dimensional ("2D") system. In a 1D parabolic approximation for the lateral confinement the potential may be expressed as:

$$V_i(x)=\frac{m\omega_i^2}{2}(x-x_i)^2+U_{0,i}, \quad (15)$$

where i=1, 2, 3 is the dot index, $\hbar\omega_i$ is the splitting between the simple harmonic energy levels, $x_i$ is the center of the dot, and $U_{0,i}$ is the local potential. In some aspects, a more accurate description of $V_i(x)$ could also include anharmonic terms, which would yield higher-order corrections to the results obtained below.

The parameters $\omega_i$, $x_i$ and $U_{0,i}$ can vary from dot to dot. In particular, $U_{0,i}$ can be controlled simply by applying appropriate voltages to the top gates, such that values are adjusted to satisfy the requirement that $\bar{\epsilon}_d=0$, and will henceforth be ignored. In addition, the $x_i$ can also be controlled electrostatically by the appropriate adjustment of gate voltages near the dot. Lastly, the parameter $\omega_i$ is the most difficult to adjust after device fabrication, because it is mainly determined by the fixed top-gate geometry, or other fixed features in the electrostatic landscape. As shown below, dot-to-dot variations in $\omega_i$ do not induce $O[\delta F]$ field fluctuations.

In particular, a uniform field fluctuation introduces a new term into Eqn. (15) of the form $-ex\delta F$. Eqn. (15) can then be rewritten as $$V_i(x)=\frac{m\omega_i^2}{2}(x-x_i')^2-ex_i\delta F-\frac{e^2\delta F^2}{2m\omega_i^2} \quad (16)$$

where $x_i'=x_i+(e/m\omega_i^2)\delta F$ represents the shifted center of the dot.

The matrix elements in Eqn. (3) may be computed from the total Hamiltonian, which includes Eqn. (16) and the kinetic energy operator. It may be noted that, although x' depends on $\delta F$, none of the matrix elements in Eqn. (3) directly depends on $x_i'$. Dot-to-dot variations in the first term on the right-hand side of Eqn. (16) can therefore be compensated via the potential $U_{0,i}$. The leading order $O[\delta F]$ fluctuation term in Eqn. (16) that modifies a matrix element is therefore $-ex_i\delta F$, which does not depend on $\omega_i$. Hence, to order $O[\delta F]$, variations in $\omega_i$ would not affect the results.

The leading-order fluctuations can now be calculated in terms of the quadrupolar detuning caused by $\delta F$. From Eqn. (2), $$\delta\epsilon_q=\delta U_2-\frac{\delta U_1+\delta U_3}{2}=e\left(-x_2+\frac{x_1+x_3}{2}\right)\delta F \quad (17)$$

which is linear in $\delta F$, a term which needs to be suppressed. This may be accomplished by adjusting the dot separations to make them equal, namely $$x_2-x_1=x_3-x_2=L_x. \quad (18)$$

Repeating this analysis for the confinement along the y axis, additional requirements may be obtained, namely, $$y_2-y_1=y_3-y_2=L_y. \quad (19)$$

In other words, the three dots would preferably be equally spaced along a line. However, these new symmetry conditions need not be necessarily enforced geometrically, and could be readily achieved by simply including two top gates to fine-tune the x and y positions of one of the dots. Such, fine-tuning can be accomplished using a number of automated control methods. Moreover, small errors in the dot position, δx, can be tolerated since they only increase the detuning by a linear factor, namely $\delta\epsilon_q = (\delta x/L)\delta\epsilon_d$, where the field fluctuations are expressed in terms of the dipolar detuning.

To demonstrate advantages of coherence properties for the herein provided CQ qubits, compared to conventional CD qubits, where the latter are not fully protected from weak fluctuations of $\epsilon_d$, the standard two-dot qubit is analyzed as follows. Specifically, assuming a standard two-level Hamiltonian $$H = \begin{pmatrix} \epsilon_d/2 & t \\ t & -\epsilon_d/2 \end{pmatrix} \quad (20)$$

express in the $\{|10\rangle_c, |01\rangle_c\}$ charge basis of a double dot. Note that the CD qubit couples only to the dipolar tuning. The qubit energy is then given by $E_{01,CD} = \sqrt{\epsilon_d^2 + 4t^2}$. By introducing fluctuations of the form $\epsilon_d \rightarrow \bar{\epsilon}_d + \delta\epsilon_d$, the qubit energy can be expanded in powers of $\delta\epsilon_d$, as follows $$E_{01,CD} = \sqrt{\bar{\epsilon}_d^2 + 4t^2} + \left[\frac{\bar{\epsilon}_d}{(\bar{\epsilon}_d^2 + 4t^2)^{1/2}}\right]\delta\epsilon_d + \left[\frac{2t^2}{(\bar{\epsilon}_d^2 + 4t^2)^{3/2}}\right]\delta\epsilon_d^2 + O[\delta\epsilon_d^3]. \quad (21)$$

The first term of $E_{01,CD}$ indicates that $\epsilon_d$ can be used to control the qubit. The second term indicates that the qubit is only protected from $O[\delta\epsilon_d]$ detuning fluctuations at the sweet spot, $\bar{\epsilon}_d = 0$.

By contrast, for the CQ qubit, the energy eigenstates can be solved by performing a fluctuation expansion, replacing $\epsilon_d \rightarrow \delta\epsilon_d$, $\epsilon_q \rightarrow \bar{\epsilon}_q + \delta\epsilon_q$, and $E \rightarrow E + \delta E$ in Eqn. (5), and collecting terms of equal order, to yield $$E_{01,CQ} = \sqrt{\bar{\epsilon}_q^2 + 8t^2} + \left[\frac{\bar{\epsilon}_q}{(\bar{\epsilon}_q^2 + 8t^2)^{1/2}}\right]\delta\epsilon_q + \left[\frac{\bar{\epsilon}_q^2 + 4t^2}{2t^2(\bar{\epsilon}_q^2 + 8t^2)^{1/2}}\right]\delta\epsilon_d^2 + O[\delta\epsilon_q^2, \delta\epsilon_d^3]. \quad (22)$$

As discussed, terms $O[\delta\epsilon_q^2]$ are much smaller than terms of $O[\delta\epsilon_d^2]$. Consistent with the discussion above, it may be seen that a charge qubit, in accordance with the present disclosure, is protected from both dipolar and quadrupolar detuning fluctuations of linear order at the double sweet spot, $\bar{\epsilon}_d = \bar{\epsilon}_q = 0$. The effects of dephasing decrease as the tunnel coupling t increases. Hence, the qubit fidelity is optimized by having large, equal tunnel couplings between the three dots, reminiscent of results obtained in a resonantly gated three-electron exchange-only qubit.

Next, the effects of fluctuations on CQ and CD gate operations are compared. The qubits are first initialized, for instance, by tuning the devices far away from their charge degeneracy points and waiting. For the CQ qubit, it may be convenient to initialize into the ground state $|L\rangle$ in the regime where $\epsilon_d = 0$, $\epsilon_q \ll 0$. Readout can be performed at the same setting. In particular, for CQ qubits, this involves measuring the charge occupation of the center dot. After initialization, the qubits can be adiabatically tuned to their sweet spots.

In general, a qubit gate implements a prescribed transformation of the qubit on the Bloch sphere. Specifically, the Bloch sphere is a geometrical representation of the state space for a two-level quantum system, where the north and south poles on the sphere represent the $|0\rangle$ and $|1\rangle$ state, respectively. Two rotation axes are commonly required for universal gate operations. For a CD qubit, it is advantageous that one of these gates is performed at the sweet spot, $\bar{\epsilon}_d = 0$, herein called the z rotation axis, since it is where the energy splitting is most fully protected from detuning fluctuations. The second universal gate would then be implemented by pulsing $\bar{\epsilon}_d$ away from the sweet spot. It is common to choose a working point $|\bar{\epsilon}_d| \geq 2t$ where the rotation axis is shifted by $\geq 45°$, thus enabling a three-step implementation of an x rotation.

For a CQ qubit, in accordance with the present disclosure, the gates may be controlled by pulsing $\bar{\epsilon}_q$. The z rotation would be advantageously implemented at the double sweet spot, $\bar{\epsilon}_d = \bar{\epsilon}_q = 0$, where the energy splitting is protected from dipolar and quadrupolar detuning fluctuations. The second universal gate operation would then be advantageously performed at $|\epsilon_q| \geq \sqrt{8}t$ while keeping $\epsilon_d = 0$ fixed, so that it is still protected from dipolar detuning fluctuations.

The $\epsilon_{01}$ fluctuation terms expressed Eqns. (21) and (22) cause dephasing, leading to the loss of quantum information in a qubit. To illustrate the advantage of the present approach as compared to previous techniques, a comparison is now made for their relative magnitudes. Specifically, z rotations performed at the sweet spot (or the double sweet spot) have very similar dephasing characteristics for the two types of qubits. In both cases, they are $O[\delta\epsilon_d^2]$. On the other hand, x rotations are performed away from the (double) sweet spot, yielding very different dephasing characteristics. That is, for CD qubits dephasing characteristics are dominated by $\delta\epsilon_d$ noise, while for CQ qubits, they are dominated by $\delta\epsilon_q$ noise. Evaluating the leading fluctuation terms at tuning values corresponding to 45° rotation axes, the size of the fluctuations is found to be reduced by the factor $\delta\epsilon_q/\delta\epsilon_d \ll 1$ for CQ qubits. For pulsed gates, the CQ qubit is protected from its pre-dominant noise source ($\delta\epsilon_d$ fluctuations) for both x and z rotations, while the CD qubit is only protected during z rotations.

As may be appreciated, leakage is not a problem for ordinary CD qubits, because there is no leakage state. CQ qubits can be carefully tuned to a symmetry point where the leakage is suppressed. However, leakage could still be a concern in the presence of $\delta\epsilon_d$ fluctuations. When $\epsilon_d \neq 0$ the block diagonalization of Eqn. (11) is imperfect, and leakage would occur during pulsed gating.

To estimate the magnitude of this effect, a pulse sequence is considered in which the qubit is initialized into the ground state $|0\rangle = |L\rangle$ when $\epsilon_q \rightarrow \infty$, then suddenly pulsed to the sweet spot at $\epsilon_q = 0$. At this location, the full 3D Hamiltonian of Eqn. (3) can be exactly diagonalized, yielding a nonzero probability of occupying the leakage state $P_X = |\langle X|L\rangle|^2 = \delta\epsilon_d^2/(\delta\epsilon_d^2 + 2t^2) \approx \delta\epsilon_d^2/2t^2$. It is noted here that the assumed voltage pulse, beginning at $\epsilon_q \rightarrow \infty$, is unphysical, namely infinite, and hence a more realistic initial state would slightly suppress this leakage.

The accuracy of this leakage estimate was verified by performing simulations of finite-voltage pulse sequences, including quasistatic noise in $\delta\epsilon_d$. A half-cosine ramp function, $\epsilon_q(t)$, with variable ramp rates was specifically considered, obtaining very good agreement with the $P_X$ estimate for fast ramps. It is envisioned that the leakage can be further suppressed by ramping $\epsilon_q$ slowly. However this could also yield low gate visibilities in the adiabatic limit. One can also compare the magnitude of leakage errors ($P_X$) to rotation errors, defined as $\delta E_{01}/E_{01}$. From Eqn. (22), it is found that $\delta E_{01}/E_{01} \cong \delta \epsilon_d^2/4t^2$, which has the same scaling form as $P_X$.

For ac gates, it is common to work in a frame rotating at the qubit frequency, with the two driven gate operations being x and y rotations, which are distinguished by the relative phase of the ac driving with respect to the intrinsic qubit rotation. It is convenient to choose a working point ($\bar{\epsilon}_d, \bar{\epsilon}_q$) that also defines the quantization axis. Both x and y rotations are achieved by driving the appropriate detuning parameter (dipolar for a charge qubit and quadrupolar for a CQ qubit) at the resonant frequency $v=E_{01}/h$, at the same working point. For the CQ qubit, the (double) sweet spot can be chosen as the working point, so that z rotations have the same dephasing characteristics as pulsed gates.

Decoherence during driven evolution is most easily analyzed in the rotating frame, where the predominant decay mechanism is longitudinal, with the corresponding decay time $T_{1\rho}$. In this case, the charge noise environment can be well approximated as quasi-Markovian, so that, on resonance, the following is obtained $$1/T_{1\rho} = 2S_2(\epsilon_{ac}/\hbar) + S_x([\epsilon_{ac}+\sqrt{8}t]/\hbar) + S_x([\epsilon_{ac}-\sqrt{8}t]/\hbar) \quad (23)$$

where $\epsilon(t)=\epsilon_{ac}\sin(E_{01}t/\hbar)$ is the resonant driving term at the sweet spot, and $S_z$ and $S_x$ are the longitudinal and transverse noise spectral densities in the lab frame, respectively. These spectral densities describe noise in the detuning parameters used to drive the rotations, corresponding to $\epsilon_d$ for CD qubits or $\epsilon_q$ for CQ qubits. In the weak driving regime, $\epsilon_{ac} \ll \sqrt{8}t$, the term $2S_z(\epsilon_{ac}/\hbar)$ would normally dominate Eqn. (23) because $S_{x,z}(\omega) \propto 1/\omega$ for charge noise. However, at the sweet spot, $\epsilon$ noise is precisely orthogonal to the quantization axis, so $S_z(\omega)=0$. This is highly advantageous for resonant driving because the other terms in Eqn. (23) are much smaller, since their arguments are much larger.

To compare $T_{1\rho}$ for CD and CQ qubits the following important observation can be made. Specifically, in the noise model above described above, $\delta \epsilon_d$ and $\delta \epsilon_q$ arise from the same fluctuators, such that the ratio of their respective noise strengths would be independent of the frequency. The decoherence rate for resonant x (or y) rotations in a CQ qubit, which are driven via the detuning parameter $\delta \epsilon_q$, would therefore be suppressed by the same small factor $\delta \epsilon_q/\delta \epsilon_d$ that was obtained for pulsed x rotations. In both cases (pulsed and resonant gates), it is expected that the CQ qubit would be protected from the predominant $\delta \epsilon_d$ noise mechanism during both x (y) and z rotations, while the CD qubit would only protected during z rotations.

Figure 6:
FIG. 6 is an illustration showing alternate charge quadrupole qubits with corresponding localized and delocalized charge state configurations, in accordance with aspects of the present disclosure.
Figure 6:
Figure 6:
Figure 6:

Up to this point, description of CQ qubits has been directed to qubit implementations formed using quantum dots, as shown in the dot-dot-dot configuration 600 of FIG. 6. However, electrons can also be trapped in confinement centers formed at donor sites, such as Si:P or GaAs:Si. Therefore, the present approach could be readily extended to include such qubit systems, provided that the symmetry requirements are satisfied. As such, FIG. 6 shows several alternative CQ geometries formed using donors and quantum dots, along with their corresponding localized and delocalized charge state configurations, |L⟩ and |D⟩. It is noted that half-filled circles in FIG. 6 represent an average occupation of ½. Specifically, FIG. 6 also shows a donor-dot-donor configuration 602, a dot-donor-dot configuration 604 and a donor-donor-donor configuration 606.

In addition to charge qubits, many types of logical spin qubits can also be protected from dipolar detuning fluctuations by employing symmetric triple-dot geometries. For example, the standard two-electron singlet-triplet qubit formed in a double quantum dot would not be protected from dipolar detuning fluctuations. However, a singlet-triplet qubit formed in a triple dot could be protected by tuning the device to one of the charge transitions (1,0,1)-(½,1,½) or (0,2,0)-(½,1,½). Here, the delocalized states with half-filled superpositions would be analogous to those shown in FIG. 6. It may be noted that the magnitudes of the local Overhauser fields on dots 1 and 3 would need to be equalized to enforce symmetry and suppress leakage outside of the qubit manifold. It is interesting to note that a different symmetric operating point was recently used to improve the coherence of a singlet-triplet qubit in a double-dot geometry. In that case, the resonant pulse was applied to the tunnel coupling, while the detuning parameter was set to a sweet spot. However, in contrast with a quadrupole qubit, such a working point cannot be used for charge detection.

In a similar fashion, quantum dot hybrid and exchange-only qubits can be also implemented as three-electron quadrupolar qubits by enforcing symmetric geometries. In this case, charge transitions occur between the configurations (1,1,1)-(3/2,0,3/2), (1,1,1)-(½,2,½) for the quantum dot hybrid qubit and (0,3,0)-(½,2,½) for the exchange-only qubit. When the qubit basis involves both singlet-like ("S") and triplet-like ("T") spin states, the singlet-triplet energy splitting in dots 1 and 3 would need to be equalized.

It is noted that the optimal working point for single-qubit operations in a conventional exchange-only qubit occurs at a double sweet spot in the (1,1,1) charging configuration. However, other modes of operation, such as two-qubit gates, readout, or coupling to a microwave stripline, may necessitate changing the charge occupations. For the conventional exchange-only qubit, the modified charge state can be taken to be (2,0,1) or (1,0,2). However, the quadrupole version employs one of the symmetric, half-filled superposition states, namely (3/2,0,3/2) or (½,2,½), yielding significant improvements in the coherence properties when the qubit is coupled to other devices. It may be emphasized that the quadrupolar working point occurs at one of the charging transitions, and is therefore different than the double sweet spot of the conventional exchange-only qubit.

Figure 7:
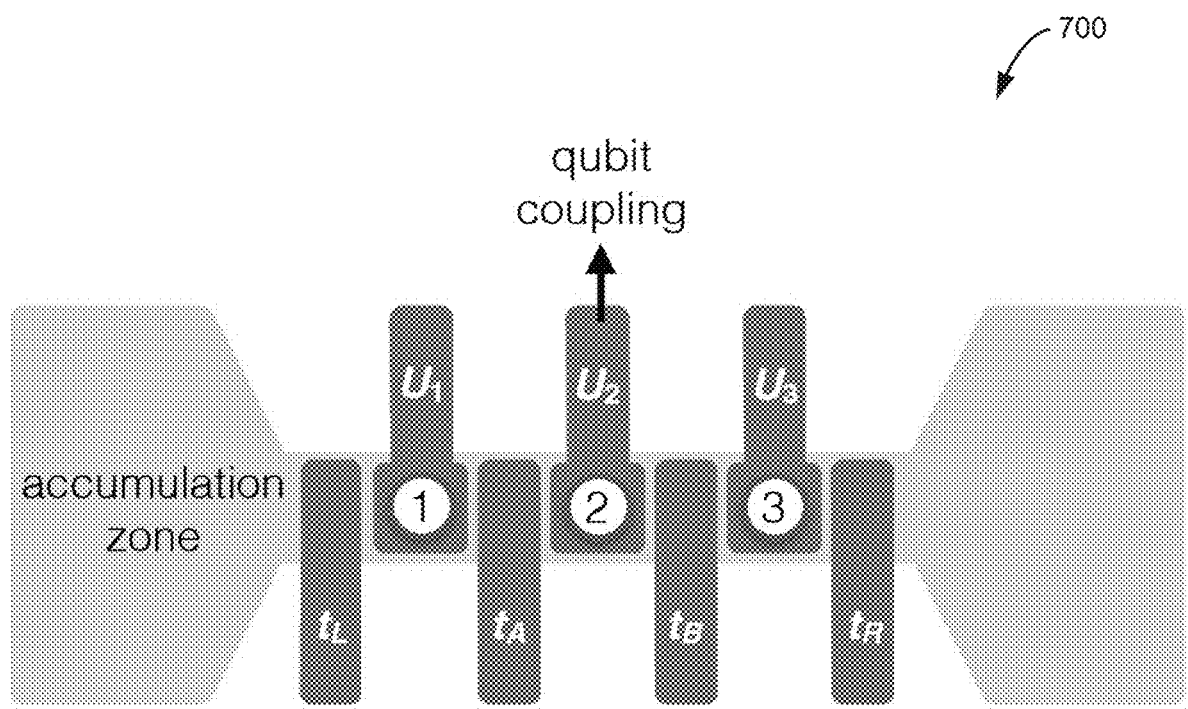
FIG. 7 shows another non-limiting example of a charge quadrupole qubit with a symmetric three-dot configuration, in accordance with aspects of the present disclosure.
Figure 8:
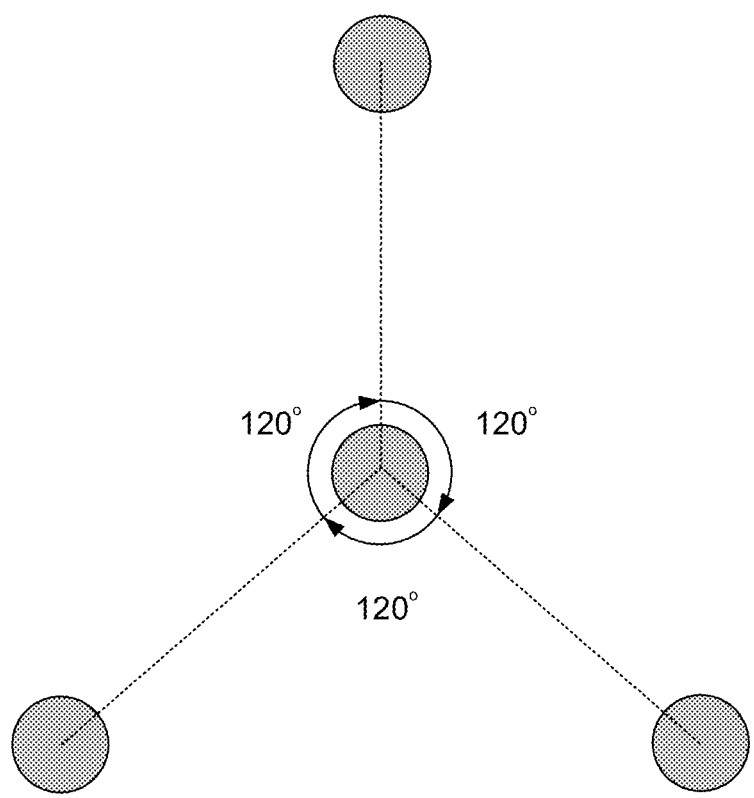
FIG. 8 shows yet another non-limiting example of a charge quadrupole gubit with a symmetric 4-dot configuration, in accordance with aspects of the present disclosure.
Figure 9:
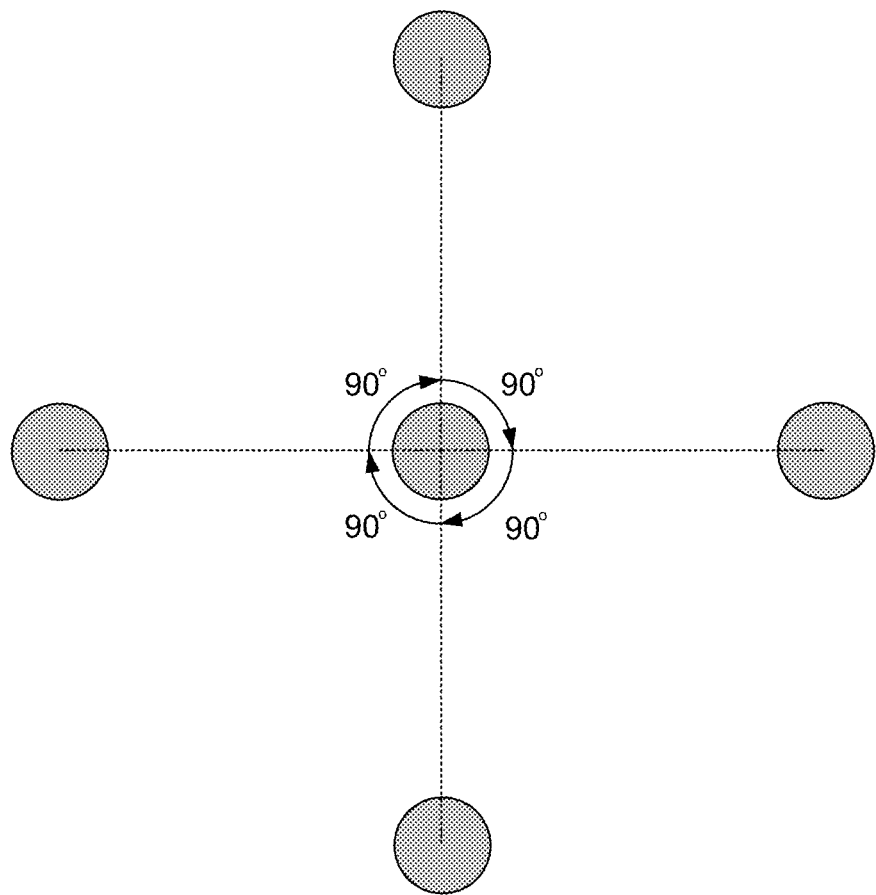
FIG. 9 shows yet another non-limiting example of a charge quadrupole qubit with a symmetric 5-dot configuration, in accordance with aspects of the present disclosure.

Two types of interactions have been proposed to mediate two-qubit gates between logical spin qubits, namely classical electrostatic (capacitive) interactions and quantum exchange interactions. Capacitive interactions may also be used to couple charge qubits. The mechanisms and methods for performing such gates may be readily adopted here, provided that qubit symmetry is preserved during the coupling. This suggests that, in three-dot implementations, the middle dots could be used for coupling to the qubits. For capacitive gates, this can be most easily accomplished by employing a floating top-gate antenna above, or near, the middle dot, as illustrated in FIG. 7. In particular, FIG. 7 shows a schematic top-gate diagram of a quadrupolar qubit 700 including both accumulation and depletion gates. The gates labeled $U_1$, $U_2$, and $U_3$ control the local potentials defining the dots, while the gates labeled $t_A$ and $t_B$ control the tunnel couplings. The quantum dots are labeled 1, 2, and 3 in FIG. 7, and the tunnel barriers to the external reservoirs are labeled $t_L$ and $t_R$. As shown, the qubit can be coupled to an external device, such as a charge sensor, a microwave stripline, or another qubit, via the middle gate $U_2$, thus preserving the device symmetry. Exchange-based gates also involve a coupling between the middle dots in each qubit. However, the exchange interaction would then dictate that the dots be in close proximity.

An important application for quadrupole qubits disclosed herein can include a cavity quantum electrodynamics ("cQED") system consisting of a triple dot capacitively coupled to a superconducting stripline resonator. Previously, couplings of up to g=30-50 MHz were reported for systems employing CD qubits. However, the desired strong coupling limit has so far remained elusive, because CD coherence times are typically of order 1 ns. The relevant figure of merit for strong coupling in this system is $g^2/\Gamma_q\Gamma_s$, where $\Gamma_q \sim 1/T_{1\rho}$ and $\Gamma_s$ are the decoherence rates of the resonantly driven qubit and the superconducting stripline, respectively.

For cQED, it is expected that quadrupole qubits, in accordance with the present disclosure, would yield a much better figure of merit compared to CD qubits. Specifically, for the CD qubit, the coupling is implemented by tuning to the dipolar sweet spot, where the dipole moment of the double dot is maximized. The capacitive coupling to the resonator is then maximized by coupling directly to one of the quantum dots. In contrast, the CQ qubit would be tuned to its double sweet spot. cQED then proceeds via the quadrupole channel by coupling the stripline to the center quantum dot to preserve the device symmetry, as shown in FIG. 7, for example. The coupling strength g and resonator decoherence rates $\Gamma_s$ are then expected be the same as for CD qubits. However, as described above, quadrupole qubits could potentially enable ac gates with $\Gamma_q$ reduced by a factor of approximately 10. It is therefore expected that the figure of merit for CQ qubits would improve by a factor of approximately 10 due to enhanced $\Gamma_q$. It is also expect that it would be possible to couple microwave striplines to logical spin qubits, including singlet-triplet, hybrid, and exchange-only qubits, using the same quadrupolar techniques to achieve strong coupling.

In summary, it is herein shown that charge qubit dephasing can be suppressed using a symmetrical qubit employing a quadrupole geometry, because in typical quantum dot devices, the quadrupolar detuning fluctuations are substantially weaker than dipolar fluctuations. On the other hand, the quadrupolar detuning parameter $\epsilon_q$ can readily be controlled via voltages applied to top gates. As such, gate times are expected to be similar for quadrupolar and dipolar qubits. Since dephasing is suppressed for CQ qubits, while the gate times are unchanged, the resulting gate fidelities are hence expected to substantially exceed those of conventional CD qubits. This is a promising result for charge qubits because the fidelities of both pulsed and resonant gating schemes are not currently high enough to enable useful error correction. Moreover, it was shown herein that the coherence properties of CQ qubits improve as the device dimensions shrink, and hence future generations of smaller CQ qubits would be capable of achieving very high gate fidelities. It was also shown that logical spin qubits in quantum dots may also benefit from a quadrupole geometry. This is especially true for ac gating, since the gate fidelities would improve for all rotations on the Bloch sphere. As described, a prominent application for quadrupolar qubits would include cavity quantum electrodynamics systems, where improvements in coherence properties could help to achieve strong coupling.

The present invention has been described in terms of one or more preferred embodiments, and it should be appreciated that many equivalents, alternatives, variations, and modifications, aside from those expressly stated, are possible and within the scope of the invention.

The invention claimed is:

1. A quantum computing system for performing quantum computation, the system comprising:
    at least one charge qubit, each qubit comprising a quantum dot assembly prepared with a symmetric charge distribution, wherein the symmetric charge distribution is configured to decouple the charge qubit from a charge noise source;
    a controller for controlling the at least one charge qubit to perform a quantum computation; and
    an output for providing a report generated using information obtained from the quantum computation performed.

2. The quantum computing system of claim 1, wherein the quantum dot assembly comprises a first quantum dot, a second quantum dot, and a third quantum dot arranged collinearly.

3. The quantum computing system of claim 2, wherein the second quantum dot is coupled to a qubit, a stripline, or a waveguide.

4. The quantum computing system of claim 2, wherein the controller is further configured to define a localized state in the second quantum dot and a delocalized state with a symmetric superposition of charge in the first quantum dot and the third quantum dot.

5. The quantum computing system of claim 1, wherein the quantum dot assembly comprises a first quantum dot, a second quantum dot, a third quantum dot, and a fourth quantum dot, wherein the second, third, and fourth quantum dots are arranged symmetrically about the first quantum dot and at 120 degree angles relative to the first quantum dot.

6. The quantum computing system of claim 1, wherein the quantum dot assembly comprises a first quantum dot, a second quantum dot, a third quantum dot, a fourth quantum dot, and a fifth dot, wherein the second, third, fourth, and fifth quantum dots are arranged symmetrically about the first quantum dot and at 90 degree angles relative to the first quantum dot.

7. The quantum computing system of claim 1, wherein the quantum dot assembly comprises at least one donor.

8. The quantum computing system of claim 1, wherein the controller is further configured to perform the quantum computation by applying at least one of a pulsed gate, a resonant gate, or a combination thereof.

9. The quantum computing system of claim 1, the system further comprising a readout circuitry configured to perform a readout of the at least one charge qubit.

10. The quantum computing system of claim 9, wherein the readout circuitry comprises at least one charge sensor.

11. The quantum computing system of claim 1, wherein the controller is further configured to prepare qubit states for the at least one charge qubit having different charge distributions and the same center of mass.

12. The quantum computing system of claim 1, wherein the charge noise source comprises a dipolar charge noise source.

13. A method for performing quantum computation, the method comprising:
    preparing a quantum dot assembly of a charge qubit with a symmetric charge distribution that is configured to decouple the charge qubit from a charge noise source;
    controlling the charge qubit to perform a quantum computation;
    performing a readout of the charge qubit following the quantum computation; and
    generating a report using information obtained from the quantum computation performed.

14. The method of claim 13, wherein the quantum dot assembly comprises a first quantum dot, a second quantum dot, and a third quantum dot arranged collinearly.

15. The method of claim 14, wherein the method further comprises preparing a localized state in the second quantum dot and a delocalized state with a symmetric superposition of charge in the first quantum dot and the third quantum dot.

16. The method of claim 13, wherein the method further comprises performing the quantum computation by applying at least one of a pulsed gate, a resonant gate, or a combination thereof.

17. The method of claim 13, wherein performing the readout comprises determining, using least one charge sensor, a charge state of at least one dot in the quantum dot assembly.

18. The method of claim 13, wherein the method further comprises preparing qubit states for the charge qubit having different charge distributions and the same center of mass.

19. A quantum computing system for performing quantum computation, the system comprising:
- a charge qubit formed using a quantum dot assembly, wherein the quantum dot assembly is prepared with a symmetric charge distribution configured to decouple the charge qubit from a charge noise source;
- a controller for controlling the charge qubit to perform a quantum computation; and
- an output for providing a report generated using information obtained from the quantum computation performed.

* * * * *